(12) United States Patent
Liu

(10) Patent No.: US 11,832,279 B2
(45) Date of Patent: *Nov. 28, 2023

(54) SIGNAL TRANSMISSION METHOD, SIGNAL TRANSMISSION APPARATUS, ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 23 days.

This patent is subject to a terminal disclaimer.

(21) Appl. No.: 17/512,514

(22) Filed: Oct. 27, 2021

(65) Prior Publication Data

US 2022/0053457 A1     Feb. 17, 2022

Related U.S. Application Data

(63) Continuation of application No. 16/611,081, filed as application No. PCT/CN2017/083300 on May 5, 2017, now Pat. No. 11,184,878.

(51) Int. Cl.
*H04W 72/04* (2023.01)
*H04W 72/30* (2023.01)
(Continued)

(52) U.S. Cl.
CPC .............. *H04W 72/30* (2023.01); *H04J 1/06* (2013.01); *H04L 5/0051* (2013.01)

(58) Field of Classification Search
CPC ........ H04J 1/06; H04L 5/0007; H04L 5/0048; H04L 5/0051; H04L 5/0053; H04L 27/20;
(Continued)

(56) References Cited

U.S. PATENT DOCUMENTS 10,903,957 B2 *  1/2021  Ko ...................... H04W 56/001
2013/0201975 A1 *  8/2013  Chen ..................... H04L 5/0053
                                                                    370/336
(Continued)

FOREIGN PATENT DOCUMENTS

CN        103906139 A        7/2014
CN        105207754 A       12/2015
(Continued)

OTHER PUBLICATIONS

International Search Report and Written Opinion to PCT Application No. PCT/CN2017/083300, dated Jan. 29, 2018 with English translation, (4p).

(Continued)

*Primary Examiner* — Phuc H Tran
(74) *Attorney, Agent, or Firm* — Arch & Lake LLP

(57) ABSTRACT

A signal transmission method is provided. The method includes: determining a target device, and transmitting a 5G signal to the target device, where the 5G signal includes a synchronization block, and the synchronization block is used to carry a PBCH, a PSS, an SSS and a DMRS, and the DMRS and the SSS are used as references for a demodulation result of the PBCH. By further setting the DMRS in the synchronization block, both the SSS and the DMRS are used as the references for the demodulation result of the PBCH, thereby ensuring that an adjusted phase of the demodulation result is as same as possible to a phase of the synchronization block before modulation of a transmission device, which greatly eliminates influence of factors such as the Doppler effect on the phase of the synchronization block during a signal transmission process.

12 Claims, 10 Drawing Sheets

(51) Int. Cl.
*H04J 1/06* (2006.01)
*H04L 5/00* (2006.01)

(58) Field of Classification Search
CPC .................. H04W 56/00; H04W 56/0035; H04W 72/005
See application file for complete search history.

(56) References Cited

U.S. PATENT DOCUMENTS

| | | | |
|---|---|---|---|
| 2013/0265945 A1* | 10/2013 | He | H04L 51/58 370/329 |
| 2013/0301491 A1* | 11/2013 | Bashar | H04W 52/0229 370/280 |
| 2015/0341908 A1* | 11/2015 | Wang | H04J 1/12 370/312 |
| 2016/0044615 A1* | 2/2016 | Bashar | H04B 7/0486 370/280 |
| 2016/0119901 A1* | 4/2016 | Zhang | H04W 56/0015 370/329 |
| 2017/0195888 A1 | 7/2017 | Gou et al. | |
| 2017/0245156 A1 | 8/2017 | Gou et al. | |
| 2017/0303220 A1 | 10/2017 | Sadeghi et al. | |
| 2018/0167195 A1* | 6/2018 | Ly | H04L 5/001 |
| 2018/0324732 A1* | 11/2018 | Park | H04W 56/0015 |
| 2019/0357159 A1* | 11/2019 | Pan | H04L 5/0007 |
| 2020/0099500 A1* | 3/2020 | Huang | H04L 5/10 |

FOREIGN PATENT DOCUMENTS

| | | |
|---|---|---|
| WO | 2014019229 A1 | 2/2014 |
| WO | 2014098401 A1 | 6/2014 |
| WO | 2016069144 A1 | 5/2016 |

OTHER PUBLICATIONS

International Preliminary Report on Patentability and Written Opinion issued in Application No. PCT/CN2017/083300, dated Nov. 5, 2019 with English translation, (8p).
First Office Action to Chinese Application No. 2017800003073, dated Apr. 29, 2020 with English translation (10p).
Nokia et al., "NR-PBCH Design", 3GPP TSG-RAN WGI#NR RI-1701060, Jan. 20, 2017, (11p).
Huawei et al., "Discussion and Evaluation on Broadcast Channel/Signals Transmission for Beam Based Initial Access", 3GPP TSG RAN WGI Meeting #88 RI-1701722, Feb. 17, 2017, (6p).
Fujitsu, "NR-PBCH design", 3GPP TSG RAN WG1 Meeting #89, Hangzhou, China, R1-1707253, Apr. 19, 2017, (10 p).

* cited by examiner

SIGNAL TRANSMISSION METHOD, SIGNAL TRANSMISSION APPARATUS, ELECTRONIC DEVICE AND COMPUTER-READABLE STORAGE MEDIUM

CROSS REFERENCE TO RELATED APPLICATIONS

The present application is a continuation application of U.S. application Ser. No. 16/611,081 filed on Nov. 5, 2019, which is the U.S. national phase of PCT Application No. PCT/CN2017/083300 filed on May 5, 2017, the entire disclosures of both of which are incorporated herein by reference for all purposes.

TECHNICAL FIELD

The present disclosure relates to the field of terminal technology and, in particular, to a signal transmission method, a signal transmission apparatus, an electronic device and a computer-readable storage medium.

BACKGROUND

At present, during the 5G (5th generation mobile communication technology) standardization process of the 3rd Generation Partnership Project (3GPP), a signal and a channel are mainly carried in a synchronization block, and the signal is transmitted by transmitting the synchronization block to User Equipment (UE).

The synchronization block carries a Primary Synchronization Signal (PSS), a Secondary Synchronization Signal (SSS) and a Physical Broadcast Channel (PBCH). The SSS serves as a reference for a PBCH demodulation result. That is, after the PBCH is demodulated, a phase of the PBCH demodulation result may be adjusted according to the SSS. However, an adjustment only based on the SSS is not sufficiently accurate.

SUMMARY

A signal transmission method, a signal transmission apparatus, an electronic device and a computer-readable storage medium are provided by the present disclosure.

According to a first aspect of the present disclosure, a signal transmission method is provided, including: determining a target device; and transmitting a 5G signal to the target device, where the 5G signal includes a synchronization block, and the synchronization block is configured to carry a physical broadcast channel, a primary synchronization signal, a secondary synchronization signal and a demodulation reference signal; where the demodulation reference signal and the secondary synchronization signal are used as references for a demodulation result of the physical broadcast channel.

Optionally, the demodulation reference signal includes a first partial signal and a second partial signal; and the first partial signal and the primary synchronization signal are frequency-division-multiplexed, and the second partial signal and the secondary synchronization signal are frequency-division-multiplexed.

Optionally, the synchronization block includes a first symbol, a second symbol, a third symbol and a fourth symbol; and the physical broadcast channel is located at the first symbol and the second symbol, the primary synchronization signal and the first partial signal are located at the third symbol, and the secondary synchronization signal and the second partial signal are located at the fourth symbol.

Optionally, the first partial signal includes a plurality of first partial sub-signals each frequency-division-multiplexed with the primary synchronization signal; and the second partial signal includes a plurality of second partial sub-signals each frequency-division-multiplexed with the secondary synchronization signal.

Optionally, the first symbol and the second symbol are each adjacent to the fourth symbol.

Optionally, the second symbol is adjacent to the third symbol and the third symbol is located at a tail of the synchronization block; or the second symbol is adjacent to the third symbol and the third symbol is located at a head of the synchronization block.

Optionally, the first symbol and the fourth symbol are each adjacent to the third symbol, the first symbol is located at a head of the synchronization block, and the second symbol is located at a tail of the synchronization block; or the first symbol and the third symbol are each adjacent to the fourth symbol, the first symbol is located at the head of the synchronization block, and the second symbol is located at the tail of the synchronization block; or the first symbol and the second symbol are each adjacent to the third symbol, the first symbol is located at the head of the synchronization block, and the fourth symbol is located at the tail of the synchronization block; or the first symbol and the second symbol are each adjacent to the third symbol, the fourth symbol is located at the head of the synchronization block, and the first symbol is located at the tail of the synchronization block.

Optionally, the synchronization block is further configured to carry a 5G physical downlink control channel; and the 5G physical downlink control channel is located at the third symbol and frequency-division-multiplexed with the primary synchronization signal and the first partial signal, or the 5G physical downlink control channel is located at the fourth symbol and frequency-division-multiplexed with the secondary synchronization signal and the second partial signal.

Optionally, the synchronization block is further configured to carry a 5G physical downlink control channel and the 5G physical downlink control channel includes a first sub-channel and a second sub-channel; and the first sub-channel is located at the third symbol and frequency-division-multiplexed with the primary synchronization signal and the first partial signal; and the second sub-channel is located at the fourth symbol and frequency-division-multiplexed with the secondary synchronization signal and the second partial signal.

Optionally, the synchronization block is further configured to carry a 5G physical downlink control channel and the synchronization block further includes a fifth symbol; and the 5G physical downlink control channel is located at the fifth symbol.

Optionally, the physical broadcast channel is further located at the fifth symbol and frequency-division-multiplexed with the 5G physical downlink control channel.

Optionally, the synchronization block is further configured to carry a 5G physical downlink control channel and the synchronization block includes a first symbol, a second symbol, a third symbol and a fourth symbol; and the physical broadcast channel is located at the first symbol and the second symbol, the primary synchronization signal and the 5G physical downlink control channel are frequency-division-multiplexed and located at the third symbol, and the secondary synchronization signal and the demodulation reference signal are frequency-division-multiplexed and located at the fourth symbol.

According to a second aspect of the present disclosure, a signal transmitting apparatus is provided, including: a determining module, configured to determine a target device; and a transmitting module, configured to transmit a 5G signal to the target device, where the 5G signal includes a synchronization block, and the synchronization block is configured to carry a physical broadcast channel, a primary synchronization signal, a secondary synchronization signal and a demodulation reference signal; where the demodulation reference signal and the secondary synchronization signal are used as references for a demodulation result of the physical broadcast channel.

Optionally, the demodulation reference signal includes a first partial signal and a second partial signal; and the first partial signal and the primary synchronization signal are frequency-division-multiplexed, and the second partial signal and the secondary synchronization signal are frequency-division-multiplexed.

Optionally, the synchronization block includes a first symbol, a second symbol, a third symbol and a fourth symbol; and the physical broadcast channel is located at the first symbol and the second symbol, the primary synchronization signal and the first partial signal are located at the third symbol, and the secondary synchronization signal and the second partial signal are located at the fourth symbol.

Optionally, the first partial signal includes a plurality of first partial sub-signals each frequency-division-multiplexed with the primary synchronization signal; and the second partial signal includes a plurality of second partial sub-signals each frequency-division-multiplexed with the secondary synchronization signal.

Optionally, the first symbol and the second symbol are each adjacent to the fourth symbol.

Optionally, the second symbol is adjacent to the third symbol and the third symbol is located at a tail of the synchronization block; or the second symbol is adjacent to the third symbol and the third symbol is located at a head of the synchronization block.

Optionally, the first symbol and the fourth symbol are each adjacent to the third symbol, the first symbol is located at a head of the synchronization block, and the second symbol is located at a tail of the synchronization block; or the first symbol and the third symbol are each adjacent to the fourth symbol, the first symbol is located at the head of the synchronization block, and the second symbol is located at the tail of the synchronization block; or the first symbol and the second symbol are each adjacent to the third symbol, the first symbol is located at the head of the synchronization block, and the fourth symbol is located at the tail of the synchronization block; or the first symbol and the second symbol are each adjacent to the third symbol, the fourth symbol is located at the head of the synchronization block, and the first symbol is located at the tail of the synchronization block.

Optionally, the synchronization block is further configured to carry a 5G physical downlink control channel; and the 5G physical downlink control channel is located at the third symbol and frequency-division-multiplexed with the primary synchronization signal and the first partial signal, or the 5G physical downlink control channel is located at the fourth symbol and frequency-division-multiplexed with the secondary synchronization signal and the second partial signal.

Optionally, the synchronization block is further configured to carry a 5G physical downlink control channel and the 5G physical downlink control channel includes a first sub-channel and a second sub-channel; and the first sub-channel is located at the third symbol and frequency-division-multiplexed with the primary synchronization signal and the first partial signal; and the second sub-channel is located at the fourth symbol and frequency-division-multiplexed with the secondary synchronization signal and the second partial signal.

Optionally, the synchronization block is further configured to carry a 5G physical downlink control channel and the synchronization block further includes a fifth symbol; and the 5G physical downlink control channel is located at the fifth symbol.

Optionally, the physical broadcast channel is further located at the fifth symbol and frequency-division-multiplexed with the 5G physical downlink control channel.

Optionally, the synchronization block is further configured to carry a 5G physical downlink control channel and the synchronization block includes a first symbol, a second symbol, a third symbol and a fourth symbol; and the physical broadcast channel is located at the first symbol and the second symbol, the primary synchronization signal and the 5G physical downlink control channel are frequency-division-multiplexed and located at the third symbol, and the secondary synchronization signal and the demodulation reference signal are frequency-division-multiplexed and located at the fourth symbol.

According to a third aspect of the present disclosure, an electronic device is provided, including: a processor; and a memory storing instructions executable by the processor. The processor is configured to: determine a target device; and transmit a 5G signal to the target device, where the 5G signal includes a synchronization block, and the synchronization block is configured to carry a physical broadcast channel, a primary synchronization signal, a secondary synchronization signal and a demodulation reference signal; where the demodulation reference signal and the secondary synchronization signal are used as references for a demodulation result of the physical broadcast channel.

According to a fourth aspect of the present disclosure, a computer-readable storage medium storing a computer program that, when executed by a processor, causes the processor to: determine a target device; and transmit a 5G signal to the target device, where the 5G signal includes a synchronization block, and the synchronization block is configured to carry a physical broadcast channel, a primary synchronization signal, a secondary synchronization signal and a demodulation reference signal; where the demodulation reference signal and the secondary synchronization signal are used as references for a demodulation result of the physical broadcast channel.

The technical solutions of the examples of the present disclosure may include the following beneficial effects.

As known from the above examples, according to the present disclosure, a phase of the demodulation result for the synchronization block may be adjusted based on the second synchronization signal so as to eliminate phase difference to some extent, and on the basis of this, the phase of the demodulation result for the synchronization block is adjusted based on the demodulation reference signal so as to further eliminate the above phase difference. In this way, it is ensured that the adjusted phase of the demodulation result is as same as possible to the phase of the synchronization block before modulation of the transmission device, thereby greatly eliminating the influence of factors such as the Doppler effect on the phase of the synchronization block during a signal transmission process.

It is understood that the above general descriptions and the subsequent detailed descriptions are merely illustrative and explanatory, and not intended to limit the present disclosure.

BRIEF DESCRIPTION OF THE DRAWINGS

To describe the technical solutions in examples of the present disclosure or in the prior art more clearly, drawings required in descriptions of the examples of the present disclosure will be briefly introduced below. It is apparent that the drawings described below are merely examples of the present disclosure and other drawings may be obtained by those of ordinary skill in the art based on these drawings in the examples of the present disclosure without creative work.

DETAILED DESCRIPTION OF THE EMBODIMENTS

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without creative work shall all fall into the scope of protection of the present disclosure.

Figure 1:
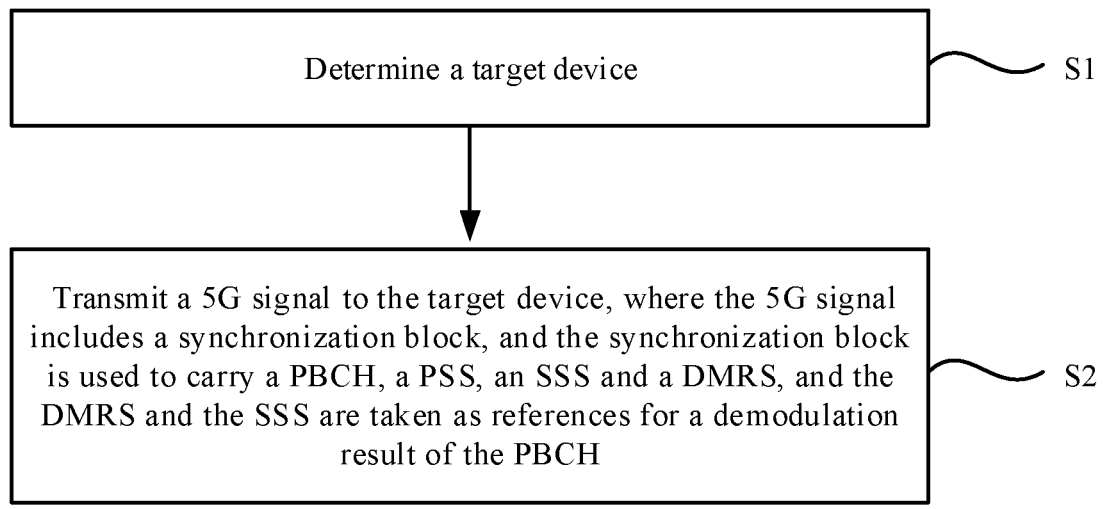
FIG. 1 is a flowchart illustrating a signal transmission method according to an example.

FIG. 1 is a flowchart illustrating a signal transmission method according to an example. As shown in FIG. 1, the method includes the following steps.

At step S1, a target device is determined.

At step S2, a 5G signal is transmitted to the target device, where the 5G signal includes a synchronization block, the synchronization block is used to carry a PBCH, a PSS, an SSS and a demodulation reference signal (DMRS).

The demodulation reference signal and the SSS are used as references for a demodulation result of the PBCH.

In an example, the target device may a 5G base station and may also be UE. In a case that the target device is the 5G base station, the method may be applied to the UE. In a case that the target device is the UE, the method may be applied to the 5G base station.

In an example, by further setting the demodulation reference signal in the synchronization block, both of the SSS and the demodulation reference signal can be used as references for the demodulation result of the PBCH, that is, a phase of the demodulation result of the PBCH is adjusted based on the SSS and the demodulation reference signal.

For example, in a scenario where a transmission device transmits a synchronization block to the target device, the transmission device firstly modulates the synchronization block and then transmits the synchronization block to the target device, where the target device performs demodulation. However, because a transmission process is subjected to influence of factors such as Doppler effect, a phase difference can exist between the synchronization block received by the target device and the synchronization block transmitted by the transmission device. Thus, a phase difference can exist between a demodulation result of the synchronization block (mainly the PBCH) and the synchronization block before modulation (mainly the PBCH).

The phase of the demodulation result for the synchronization block may be adjusted according to the SSS so that the phase difference is eliminated to some extent. On the basis of this, the phase of the demodulation result for the synchronization block may be adjusted according to the demodulation reference signal, so that the above phase difference is further eliminated. In this way, it is guaranteed that the adjusted phase of the demodulation result is as same as possible to the phase of the synchronization block before modulation of the transmission device, thereby greatly eliminating the influence of factors such as the Doppler effect on the phase of the synchronization block during a signal transmission process.

In an example, the phase of the demodulation result of the PBCH may be firstly adjusted according to the SSS, and then the phase of the demodulation result of the PBCH is adjusted according to the demodulation reference signal; or the phase of the demodulation result of the PBCH is firstly adjusted according to the demodulation reference signal and then the phase of the demodulation result of the PBCH may be adjusted according to the SSS; or the phase of the demodulation result of the PBCH is adjusted according to the SSS and the demodulation reference signal at the same time. In the above three adjustment manners, the same adjustment effect may be achieved for the phase of the demodulation result. The adjustment manners may be selected according to actual needs.

Optionally, the demodulation reference signal includes a first partial signal and a second partial signal.

The first partial signal is frequency-division-multiplexed with the PSS, and the second partial signal is frequency-division-multiplexed with the SSS.

In an example, a bandwidth of the synchronization block is preset. On the one hand, the PSS and the SSS are set at different symbols (unit in a time domain) in a time domain, and on the other hand, data volume of the PSS and the SSS will not occupy one complete bandwidth. Thus, the demodulation reference signal may be split into two parts, the first partial signal is frequency-division-multiplexed with the PSS, and the second partial signal is frequency-division-multiplexed with the SSS. That is, the first partial signal and the PSS are set in the same symbol so that the first partial signal is transmitted by using a portion of the bandwidth for the symbol which is not occupied by the PSS; and the second partial signal and the SSS are set in the same symbol so that the second partial signal is transmitted by using a portion of the bandwidth for the symbol which is not occupied by the SSS. In this way, a high utilization rate of the bandwidth can be guaranteed.

Figure 2:
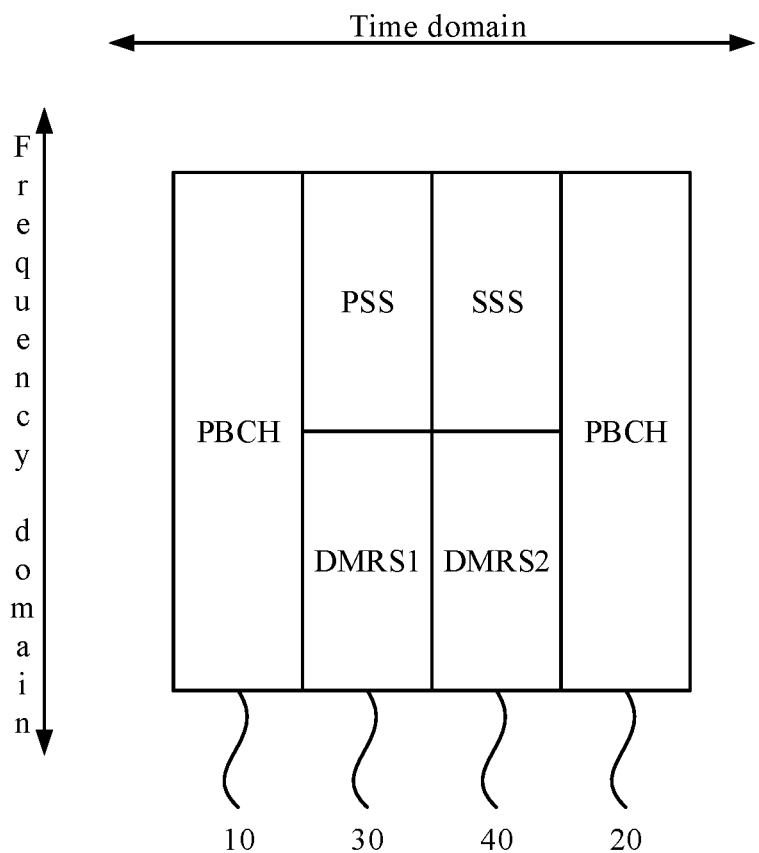
FIG. 2 is a schematic diagram illustrating a synchronization block according to an example.

FIG. 2 is a schematic diagram illustrating a synchronization block according to an example. As shown in FIG. 2, the synchronization block includes a first symbol 10, a second symbol 20, a third symbol 30 and a fourth symbol 40.

The PBCH is located at the first symbol 10 and the second symbol 20, the PSS and the first partial signal DMRS 1 are located at the third symbol 30, and the SSS and the second partial signal DMRS 2 are located at the fourth symbol 40.

In an example, on the basis that the first partial signal and the PSS are frequency-division-multiplexed and the second partial signal and the SSS are frequency-division-multiplexed, the PBCH, the PSS, the SSS, the first partial signal DMRS 1, and the second partial signal DMRS 2 may be further set according to the example shown in FIG. 2. As shown FIG. 2, the PSS and the first partial signal DMRS 1 are set in the same symbol, e.g., in the third symbol 30, and the SSS and the second partial signal DMRS 2 are set in the same symbol, e.g., in the fourth symbol 40. According to contents carried by the PBCH, it is required to ensure that the PBCH occupies a complete bandwidth and is disposed in at least two symbols. Therefore, the PBCH may be set in two symbols, e.g., the first symbol 10 and the second symbol 20.

It should be noted that numerals corresponding to the symbols do not correspond to a sequence of the symbols in the time domain in examples shown in FIG. 2 and other drawings below. For example, in the example shown in FIG. 2, the sequence of different symbols in the time domain is from left to right or from right to left.

Figure 3:
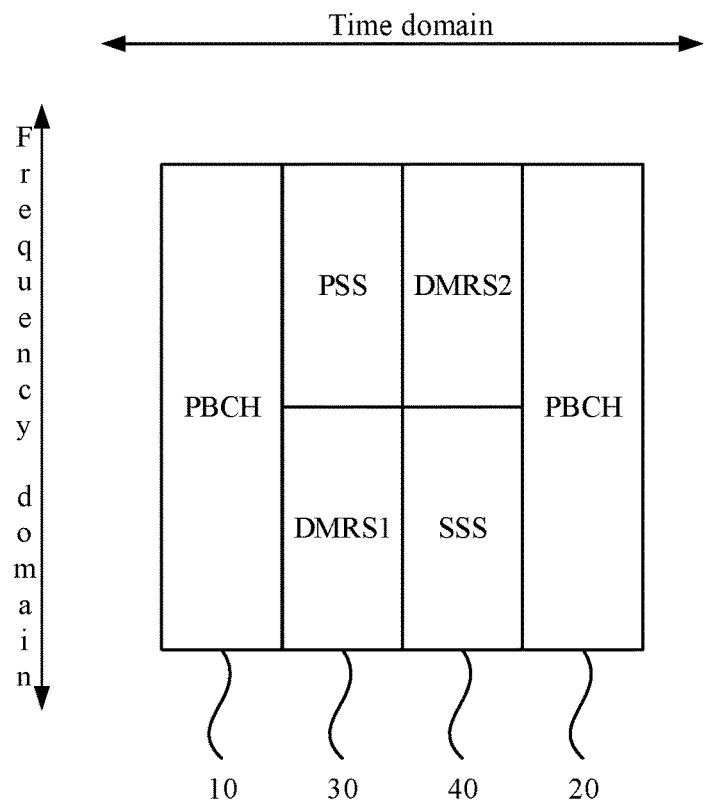
FIG. 3 is a schematic diagram illustrating another synchronization block according to an example.

FIG. 3 a schematic diagram illustrating another synchronization block according to an example.

In an example, as shown in FIG. 3, the bandwidth occupied by the PSS and the SSS is not limited to the same positions at the bandwidth shown in FIG. 2. For example, as shown in FIG. 3, the PSS may be located at a head of the bandwidth and the SSS may be located at a tail of the bandwidth.

Optionally, the first partial signal includes a plurality of first partial sub-signals each frequency-division-multiplexed with the PSS.

The second partial signal includes a plurality of second partial sub-signals each frequency-division-multiplexed with the SSS.

Figure 4:
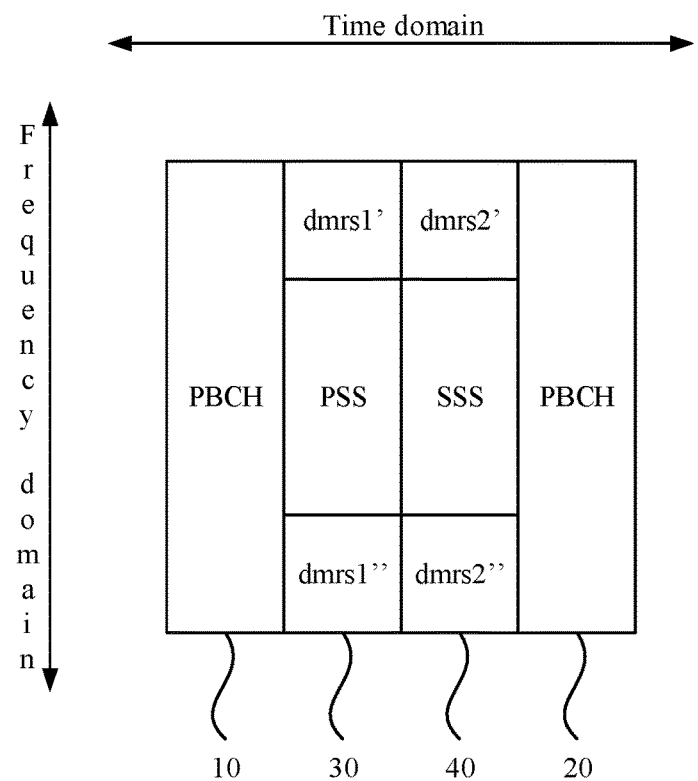
FIG. 4 is a schematic diagram illustrating still another synchronization block according to an example.

FIG. 4 is a schematic diagram illustrating still another synchronization block according to an example.

In an example, a scenario of the example shown in FIG. 2 is taken as an example. As shown FIG. 4, on the basis of the example shown in FIG. 2, the first partial signal DMRS 1 may further include a plurality of first partial sub-signals, for example, two first partial sub-signals, one of the first partial sub-signal DMRS 1' is located at a head of the bandwidth and the other first partial sub-signal DMRS 1" is located at a tail of the bandwidth. The second partial signal DMRS 2 may further include a plurality of second partial sub-signals, for example, two second partial sub-signals, one of the second partial sub-signal DMRS 2'is located at the head of the bandwidth and the other second partial sub-signal DMRS 2" is located at the tail of the bandwidth. In this case, the positions of the different signals may be further adjusted according to needs as long as the first partial sub-signal and the PSS are frequency-division-multiplexed and the second partial sub-signal and the SSS are frequency-division-multiplexed.

Figure 5:
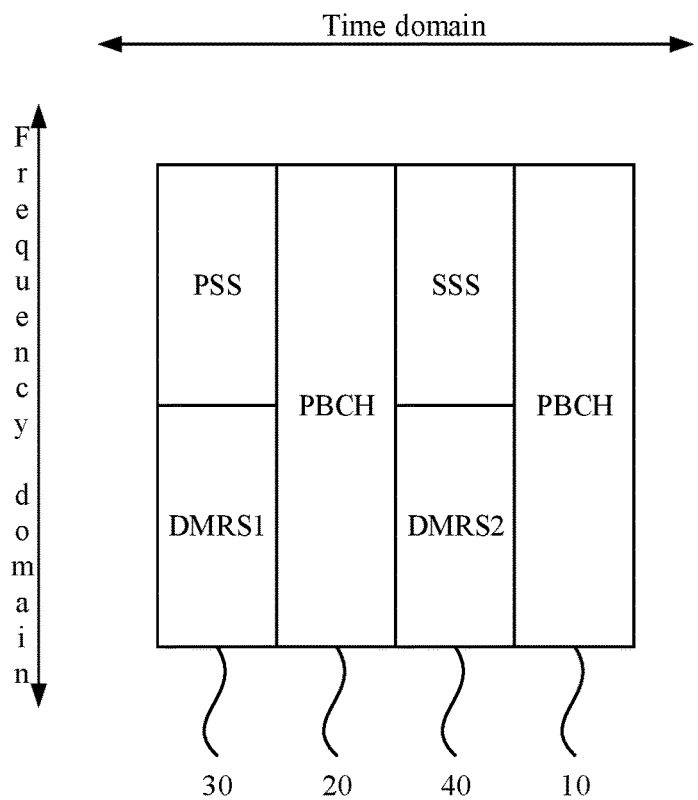
FIG. 5 is a schematic diagram illustrating still another synchronization block according to an example.

FIG. 5 is a schematic diagram illustrating still another synchronization block according to an example. As shown in FIG. 5, the first symbol 10 and the second symbol 20 are each adjacent to the fourth symbol 40.

In an example, influence affected by the synchronization block during a transmission process may involve contents corresponding to each symbol, and the farther the symbols are, the greater the difference degree in the corresponding affected contents is. Correspondingly, the closer the symbols are, the smaller the difference degree in the corresponding affected contents is.

The contents corresponding to the first symbol and the second symbol are PBCH. If the fourth symbol is set farther away from the first symbol or the second symbol, a difference degree between influence of the SSS and demodulation reference signal in the fourth symbol and influence of the PBCH in the first symbol or the second symbol is larger. Thus, the accuracy of taking the SSS and the demodulation reference signal as references for the demodulation result of the PBCH is lower.

Therefore, by setting the first symbol 10 and the second symbol 20 to be adjacent to the fourth symbol 40, it can be ensured that the difference degree between the influence of the SSS and the second partial signal DMRS 2 in the fourth symbol 40 and the influence of the PBCH in the first symbol 10 or the second symbol 20 is smaller. Further, it is ensured that the accuracy of taking the SSS and the second partial signal DMRS 2 as the references for the demodulation result of the PBCH is higher.

Figure 6:
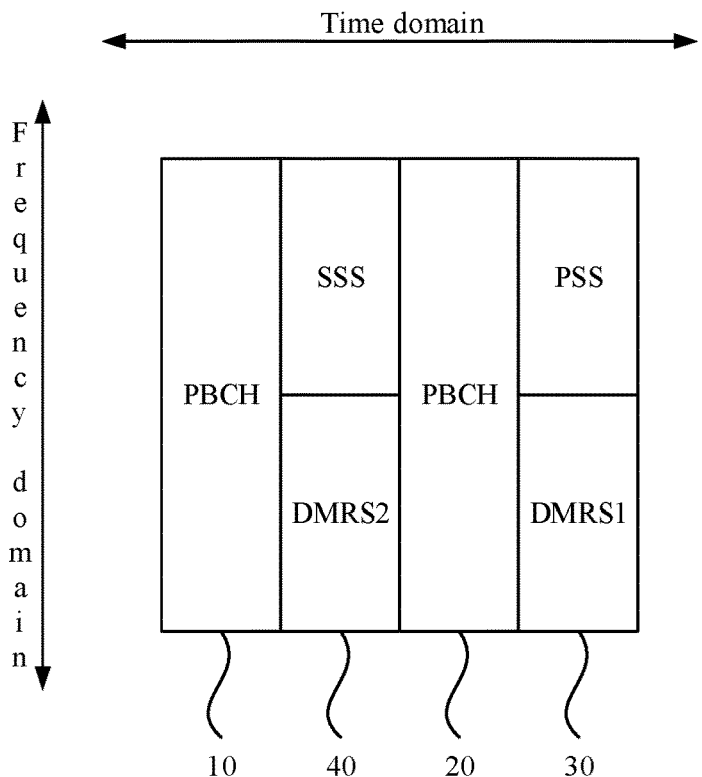
FIG. 6 is a schematic diagram illustrating still another synchronization block according to an example.

FIG. 6 is a schematic diagram illustrating still another synchronization block according to an example.

Optionally, the second symbol 20 is adjacent to the third symbol 30 and the third symbol 30 is located at a tail of the synchronization block (as shown in FIG. 6); or the second symbol 20 is adjacent to the third symbol 30 and the third symbol 30 is located at a head of the synchronization block (as shown in FIG. 5).

In an example, the case that the first symbol 10 and the second symbol 20 are each adjacent to the fourth symbol 40 may include two cases shown in FIG. 5 and FIG. 6 which may be set according to actual needs.

Figure 7:
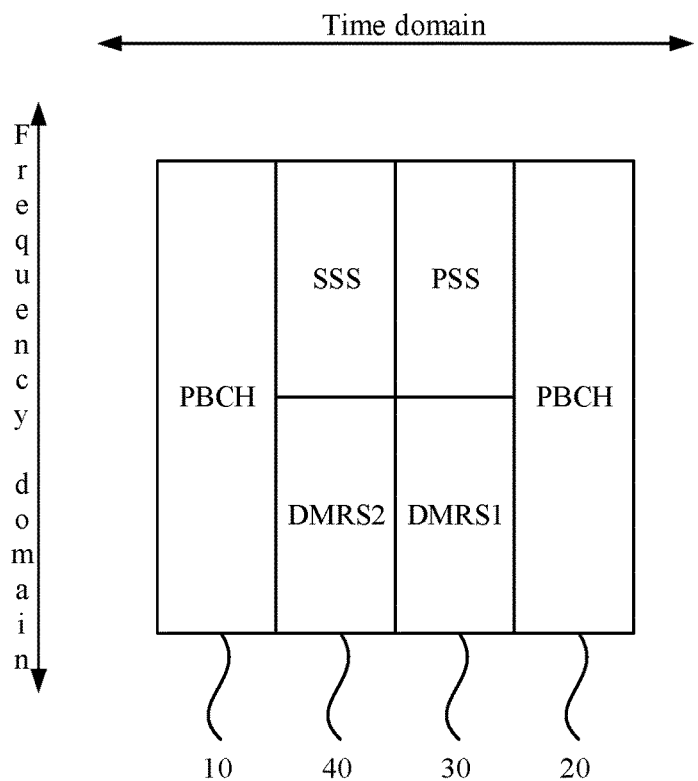
FIG. 7 is a schematic diagram illustrating still another synchronization block according to an example.
Figure 8:
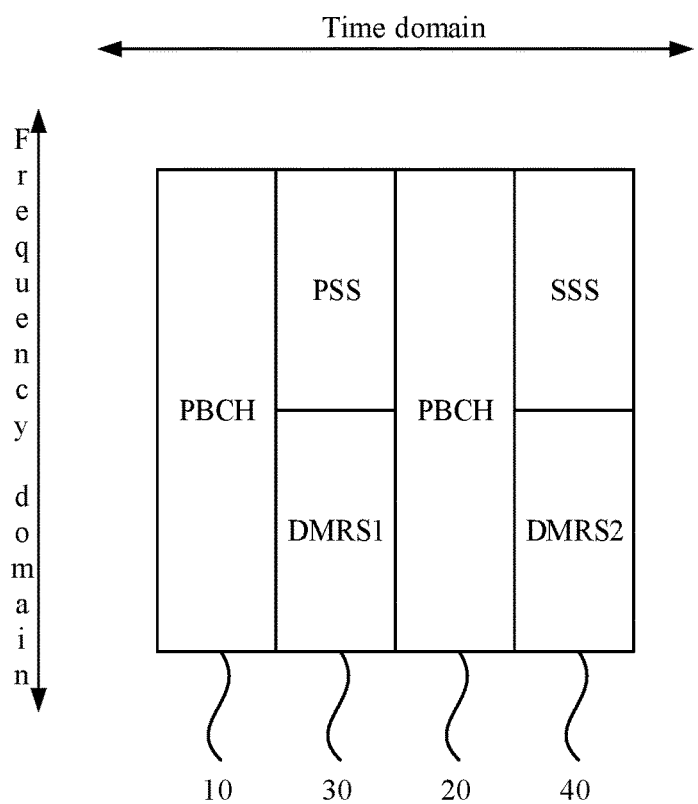
FIG. 8 is a schematic diagram illustrating still another synchronization block according to an example.
Figure 9:
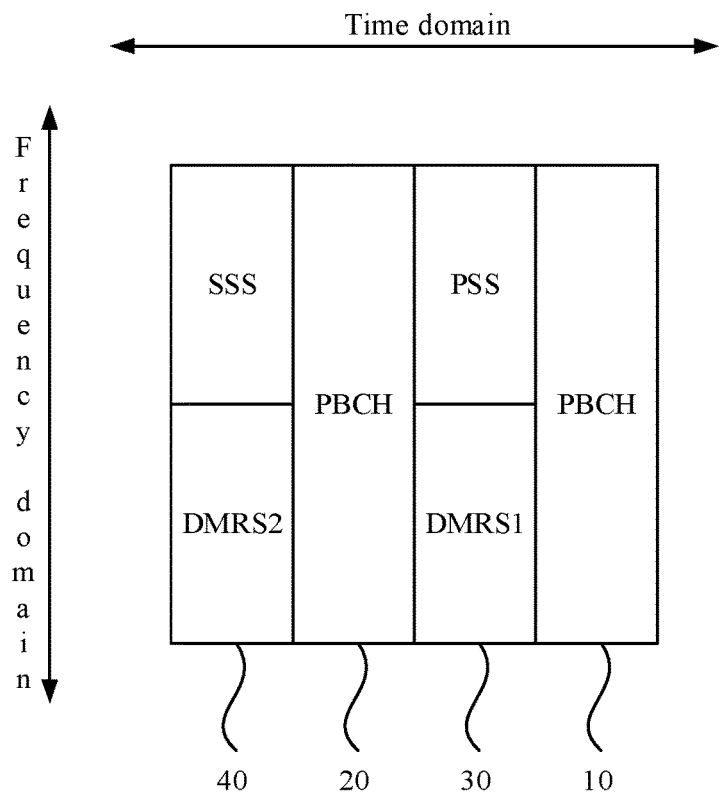
FIG. 9 is a schematic diagram illustrating still another synchronization block according to an example.

FIG. 7 is a schematic diagram illustrating still another synchronization block according to an example. FIG. 8 is a schematic diagram illustrating still another synchronization block according to an example. FIG. 9 is a schematic diagram illustrating still another synchronization block according to an example.

Optionally, the first symbol 10 and the fourth symbol 40 are each adjacent to the third symbol 30, the first symbol 10 is located at a head of the synchronization block and the second symbol 20 is located at a tail of the synchronization block (as shown in FIG. 2); or the first symbol 10 and the third symbol 30 are each adjacent to the fourth symbol 40, the first symbol 10 is located at the head of the synchronization block and the second symbol 20 is located at the tail of the synchronization block (as shown in FIG. 7); or the first symbol 10 and the second symbol 20 are each adjacent to the third symbol 30, the first symbol 10 is located at the head of the synchronization block and the fourth symbol 40 is located at the tail of the synchronization block (as shown in FIG. 8); or the first symbol 10 and the second symbol 20 are each adjacent to the third symbol 30, the fourth symbol 40 is located at the head of the synchronization block and the first symbol 10 is located at the tail of the synchronization block (as shown in FIG. 9).

In an example, the synchronization block further includes the cases shown in FIGS. 2, 7, 8 and 9 in addition to the case that the first symbol 10 and the second symbol 20 are each adjacent to the fourth symbol 40 as shown in FIGS. 5 and 6. These cases may be set according to needs.

Figure 10:
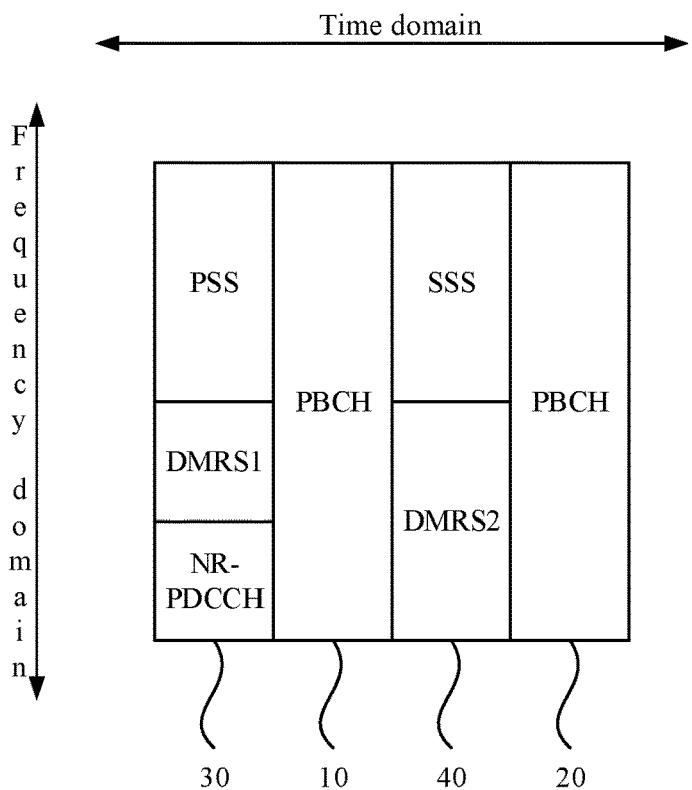
FIG. 10 is a schematic diagram illustrating still another synchronization block according to an example.
Figure 11:
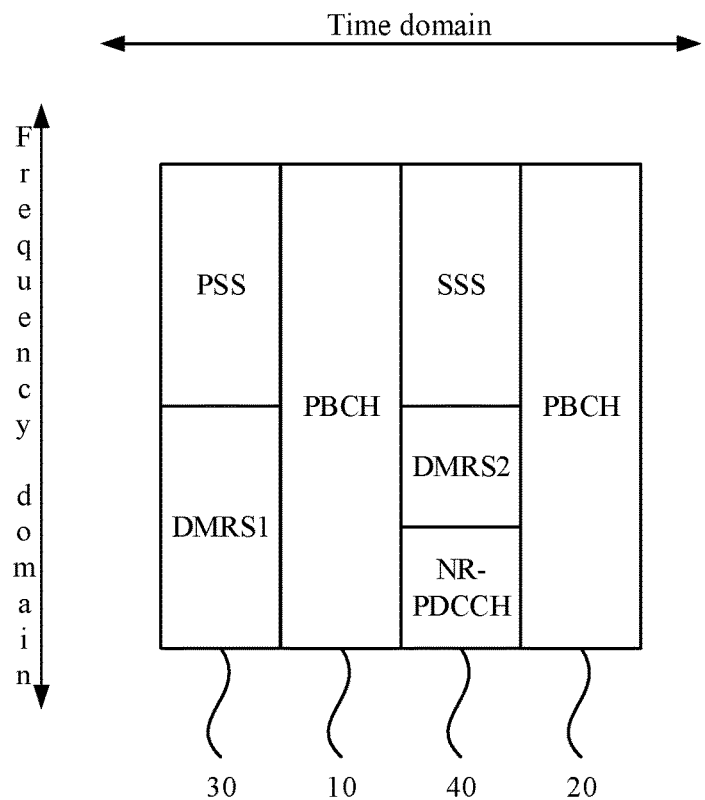
FIG. 11 is a schematic diagram illustrating still another synchronization block according to an example.

FIG. 10 is a schematic diagram illustrating still another synchronization block according to an example. FIG. 11 is a schematic diagram illustrating still another synchronization block according to an example. The synchronization block is further used to carry a 5G physical downlink control channel NR-PDCCH (a Physical Downlink Control Channel in the 5G New Radio Standard of 3GPP).

The NR-PDCCH is located at the third symbol 30 (shown in FIG. 10) and frequency-division-multiplexed with the PSS and the first partial signal. Or the NR-PDCCH is located at the fourth symbol 40 (shown in FIG. 11) and frequency-division-multiplexed with the SSS and the second partial signal.

In an example, in addition to carrying the PBCH, the PSS, the SSS and the DMRS, the synchronization block further carries the NR-PDCCH. The NR-PDCCH may be used to carry indication of Paging or other information. Since the NR-PDCCH may carry diversification information, the synchronization block may be facilitated to transmit diversification information to the target device by setting the synchronization block to additionally carry the NR-PDCCH.

Figure 12:
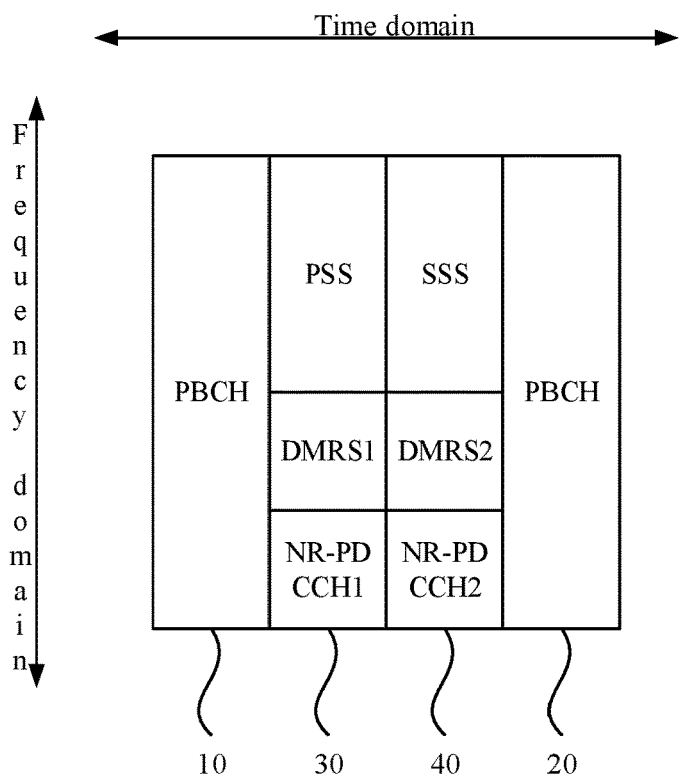
FIG. 12 is a schematic diagram illustrating still another synchronization block according to an example.
Figure 13:
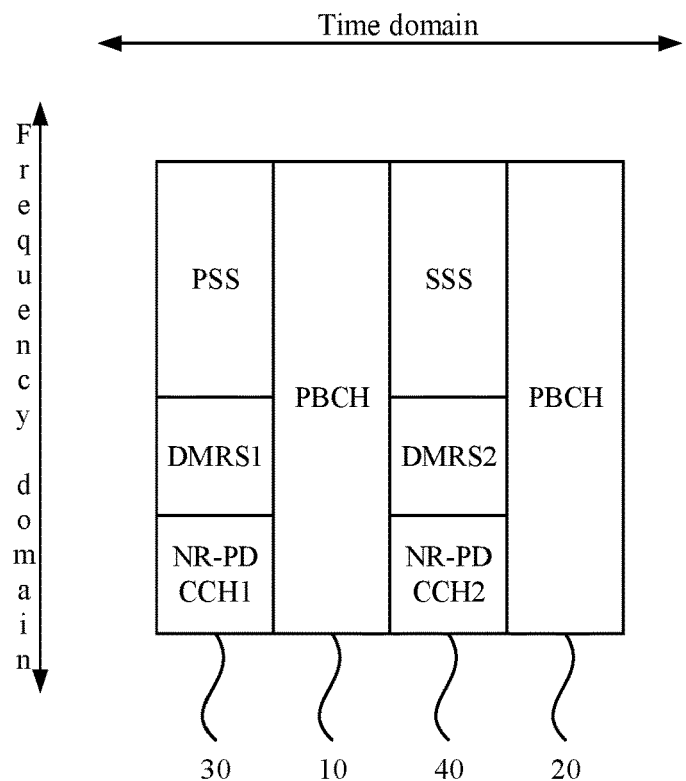
FIG. 13 is a schematic diagram illustrating still another synchronization block according to an example.

FIG. 12 is a schematic diagram illustrating still another synchronization block according to an example. FIG. 13 is a schematic diagram illustrating still another synchronization block according to an example. As shown in FIGS. 12 and 13, the synchronization block may be further used to carry a NR-PDCCH and the NR-PDCCH includes a first sub-channel NR-PDCCH 1 and a second sub-channel NR-PDCCH 2.

The first sub-channel NR-PDCCH 1 is located at the third symbol 30 and frequency-division-multiplexed with the PSS and the first partial signal. The second sub-channel NR-PDCCH 2 is located at the fourth symbol 40 and frequency-division-multiplexed with the SSS and the second partial signal.

In an example, a bandwidth and a symbol occupied by the NR-PDCCH in the synchronization block may be adjusted according to a bandwidth to be occupied by the signals carried in the NR-PDCCH.

For example, in a case that the bandwidth to be occupied by the signals carried in the NR-PDCCH is small, the NR-PDCCH may be set in the synchronization block according to the examples shown in FIGS. 10 and 11, that is, only a part of the bandwidth corresponding to one symbol is occupied.

In a case that the bandwidth to be occupied by the signals carried by the NR-PDCCH is large, the NR-PDCCH is divided into the first sub-channel NR-PDCCH 1 and the second sub-channel NR-PDCCH 2 according to the examples shown in FIGS. 12 and 13. The bandwidth occupied by the first partial signal DMRS 1 is properly reduced, so that the first sub-channel NR-PDCCH 1 is set in the bandwidth corresponding to the third symbol 30. The bandwidth occupied by the second partial signal DMRS 2 is properly reduced, so that the second sub-channel NR-PDCCH 2 is set in the bandwidth corresponding to the fourth symbol 40. In this way, it is ensured that allocation is completed with as few occupied symbols as possible.

Figure 14:
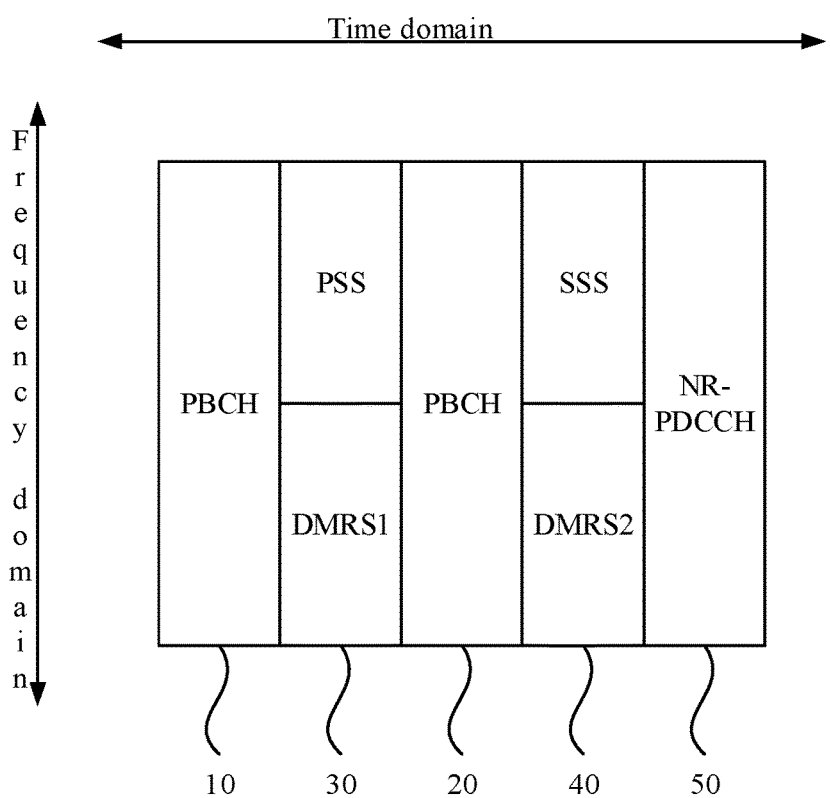
FIG. 14 is a schematic diagram illustrating still another synchronization block according to an example.

FIG. 14 is a schematic diagram illustrating still another synchronization block according to an example. As shown in FIG. 14, the synchronization block is further used to carry the NR-PDCCH, where the synchronization block further includes a fifth symbol 50.

The NR-PDCCH is located in the fifth symbol 50.

In an example, on the basis of the examples shown in FIGS. 12 and 13, when the NR-PDCCH carries excessive signals and cannot be set in the third symbol 30 or the fourth symbol 40 by properly reducing the bandwidth occupied by the DMRS, the fifth symbol 50 may be further extended in the synchronization block, and the NR-PDCCH is set in the fifth symbol 50, thereby ensuring that the NR-PDCCH can successfully carry information.

Figure 15:
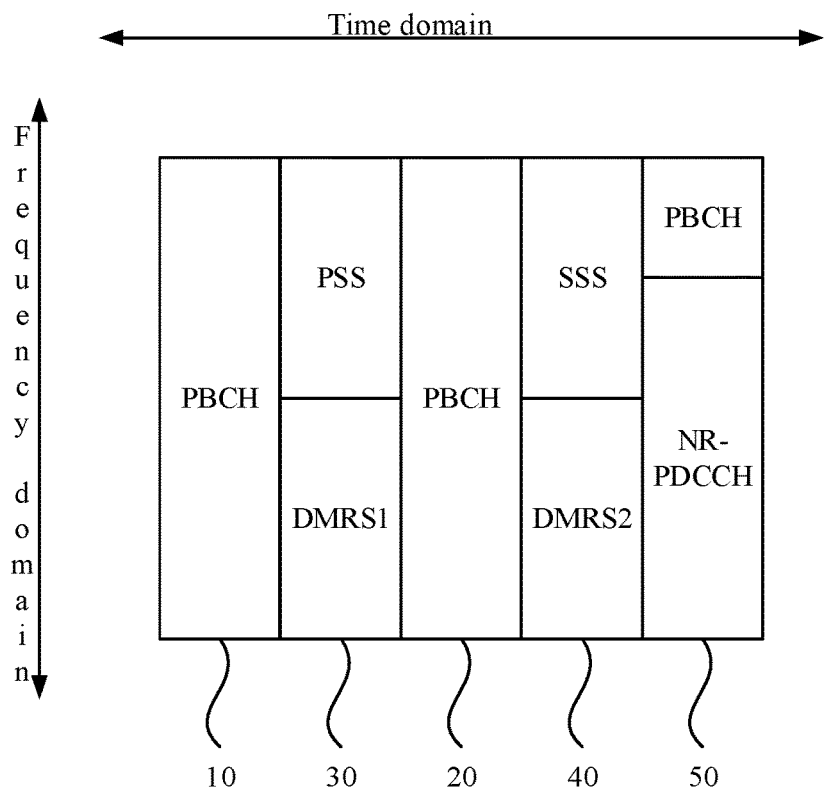
FIG. 15 is a schematic diagram illustrating still another synchronization block according to an example.

FIG. 15 is a schematic diagram illustrating still another synchronization block according to an example. As shown in FIG. 15, the PBCH is further located in the fifth symbol 50 and frequency-division-multiplexed with the NR-PDCCH.

In an example, on the basis that the synchronization block includes the fifth symbol 50, if the PBCH also carries excessive signals, when the bandwidths corresponding to the first symbol 10 and the second symbol 20 are insufficient for transmission, a part of the bandwidths corresponding to the first symbol 10 and the second symbol 20 which is insufficient for transmission may be set in the fifth symbol 50. Thus, it is not needed to extend an additional symbol in the synchronization block, thereby ensuring the allocation is completed with as few occupied symbols as possible.

Figure 16:
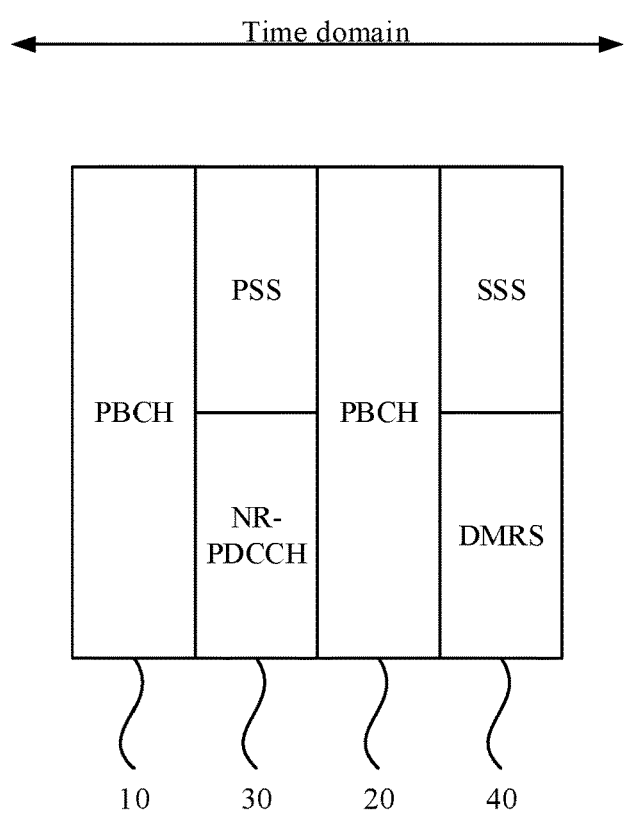
FIG. 16 is a schematic diagram illustrating still another synchronization block according to an example.

FIG. 16 is a schematic diagram illustrating still another synchronization block according to an example. As shown in FIG. 16, the synchronization block is further used to carry the NR-PDCCH, and the synchronization block includes the first symbol 10, the second symbol 20, the third symbol 30 and the fourth symbol 40.

The PBCH is located at the first symbol 10 and the second symbol 20. The PSS and the NR-PDCCH are frequency-division-multiplexed, and located at the third symbol 30. The SSS and the DMRS are frequency-division-multiplexed, and located at the fourth symbol 40.

In an example, in a case that the synchronization block carries the NR-PDCCH, the PSS and the NR-PDCCH are frequency-division-multiplexed and set in the same symbol, e.g., the third symbol 30. The SSS and the DMRS are set in the same symbol, e.g., the fourth symbol 40. Thus, on the one hand, allocation is completed with as few occupied symbols as possible, and on the other hand, it is ensured that the SSS and the DMRS, which are used as references for the demodulation result of the PBCH, can be located in the same symbol, so that both can be demodulated as references at the same time.

In an example, different symbols may be adjusted by combining the example in FIG. 16 and the examples shown in FIGS. 5-9. That is, according to the examples of FIGS. 5-9, the first symbol and the second symbol in each example above may be reversed, which will not be repeated here.

Corresponding to the above examples of the signal transmission method, the present disclosure further provides an example of a signal transmission apparatus.

Figure 17:
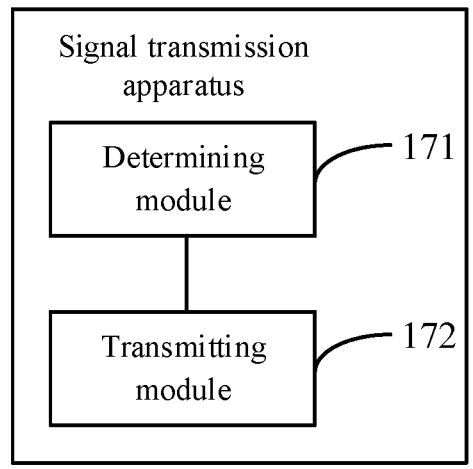
FIG. 17 is block diagram illustrating a signal transmission apparatus according to an example.

FIG. 17 is a block diagram illustrating a signal transmission apparatus according to an example. As shown in FIG. 17, the apparatus includes:

a determining module 171, configured to determine a target device; and a transmitting module 172, configured to transmit a 5G signal to the target device, where the 5G signal includes a synchronization block, and the synchronization block is configured to carry a PBCH, a PSS, an SSS and a demodulation reference signal;

where the demodulation reference signal and the SSS are used as references for a demodulation result of the PBCH.

Optionally, the demodulation reference signal includes a first partial signal and a second partial signal; and the first partial signal and the primary synchronization signal are frequency-division-multiplexed, and the second partial signal and the secondary synchronization signal are frequency-division-multiplexed.

Optionally, the synchronization block includes a first symbol, a second symbol, a third symbol and a fourth symbol; and the physical broadcast channel is located at the first symbol and the second symbol, the primary synchronization signal and the first partial signal are located at the third symbol, and the secondary synchronization signal and the second partial signal are located at the fourth symbol.

Optionally, the first partial signal includes a plurality of first partial sub-signals each frequency-division-multiplexed with the primary synchronization signal; and the second partial signal includes a plurality of second partial sub-signals each frequency-division-multiplexed with the secondary synchronization signal.

Optionally, the first symbol and the second symbol are each adjacent to the fourth symbol.

Optionally, the second symbol is adjacent to the third symbol and the third symbol is located at a tail of the synchronization block; or the second symbol is adjacent to the third symbol and the third symbol is located at a head of the synchronization block.

Optionally, the first symbol and the fourth symbol are each adjacent to the third symbol, the first symbol is located at a head of the synchronization block, and the second symbol is located at a tail of the synchronization block; or the first symbol and the third symbol are each adjacent to the fourth symbol, the first symbol is located at the head of the synchronization block, and the second symbol is located at the tail of the synchronization block; or the first symbol and the second symbol are each adjacent to the third symbol, the first symbol is located at the head of the synchronization block, and the fourth symbol is located at the tail of the synchronization block; or the first symbol and the second symbol are each adjacent to the third symbol, the fourth symbol is located at the head of the synchronization block, and the first symbol is located at the tail of the synchronization block.

Optionally, the synchronization block is further configured to carry a 5G physical downlink control channel; and the 5G physical downlink control channel is located at the third symbol and frequency-division-multiplexed with the primary synchronization signal and the first partial signal, or the 5G physical downlink control channel is located at the fourth symbol and frequency-division-multiplexed with the secondary synchronization signal and the second partial signal.

Optionally, the synchronization block is further configured to carry a 5G physical downlink control channel and the 5G physical downlink control channel includes a first sub-channel and a second sub-channel; and the first sub-channel is located at the third symbol and frequency-division-multiplexed with the primary synchronization signal and the first partial signal; and the second sub-channel is located at the fourth symbol and frequency-division-multiplexed with the secondary synchronization signal and the second partial signal.

Optionally, the synchronization block is further configured to carry a 5G physical downlink control channel and the synchronization block further includes a fifth symbol; and the 5G physical downlink control channel is located at the fifth symbol.

Optionally, the physical broadcast channel is further located at the fifth symbol and frequency-division-multiplexed with the 5G physical downlink control channel.

Optionally, the synchronization block is further configured to carry a 5G physical downlink control channel and the synchronization block includes a first symbol, a second symbol, a third symbol and a fourth symbol; and the physical broadcast channel is located at the first symbol and the second symbol, the primary synchronization signal and the 5G physical downlink control channel are frequency-division-multiplexed and located at the third symbol, and the secondary synchronization signal and the demodulation reference signal are frequency-division-multiplexed and located at the fourth symbol.

The specific implementations of performing different modules of the apparatus for the above examples have been described in detail in the examples of the method, and therefore will not be repeated here.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, the present disclosure further provides a signal transmission apparatus, including a processor, and a memory storing instructions executable by the processor; where the processor is configured to determine a target device, and transmit a 5G signal to the target device. The 5G signal includes a synchronization block and the synchronization block is used to carry a PBCH, a PSS, an SSS and a demodulation reference signal. The demodulation reference signal and the SSS are used as references for a demodulation result of the PBCH.

Correspondingly, the present disclosure further provides a terminal, including a memory and one or more programs. The one or more programs are stored in the memory and configured to execute the following operation instructions contained in the one or more programs through one or more processors: determining a target device, and transmitting a 5G signal to the target device. The 5G signal includes a synchronization block and the synchronization block is used to carry a PBCH, a PSS, an SSS and a demodulation reference signal. The demodulation reference signal and the SSS are used as references for a demodulation result of the PBCH.

Figure 18:
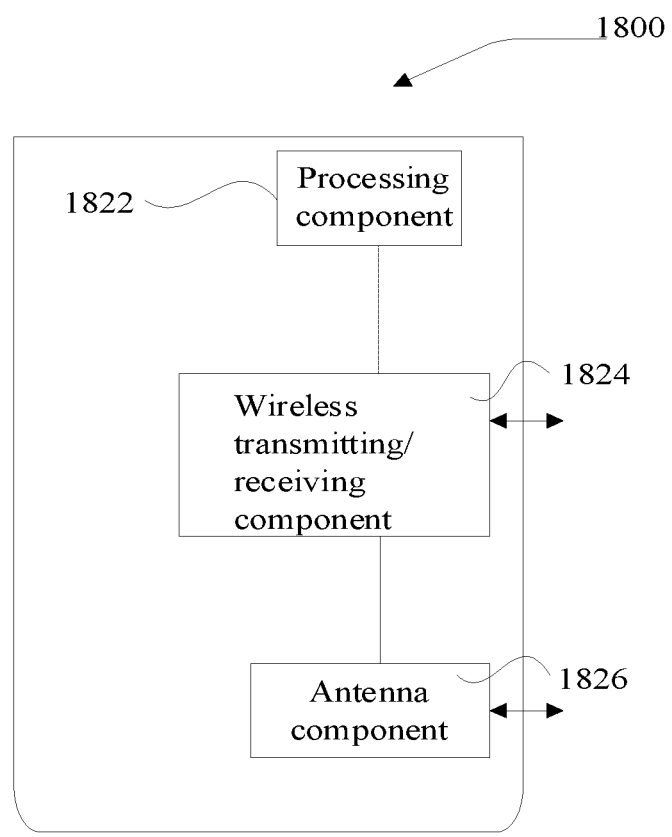
FIG. 18 is a structural diagram illustrating a signal transmission apparatus according to an example.

FIG. 18 is a structural diagram illustrating a signal transmission apparatus 1800 according to an example. The apparatus 1800 may be provided as a base station. As shown in FIG. 18, the apparatus 1800 includes a processing component 1822, a wireless transmitting/receiving component 1824, an antenna component 1826 and a signal processing component specific to a wireless interface. The processing component 1822 may further include one or more processors.

One processor of the processing component 1822 may be configured to:
determine a target device; and
transmit a 5G signal to the target device, where the 5G signal includes a synchronization block, and the synchronization block is configured to carry a PBCH, a PSS, an SSS and a DMRS. The DMRS and the SSS are used as references for a demodulation result of the PBCH.

Figure 19:
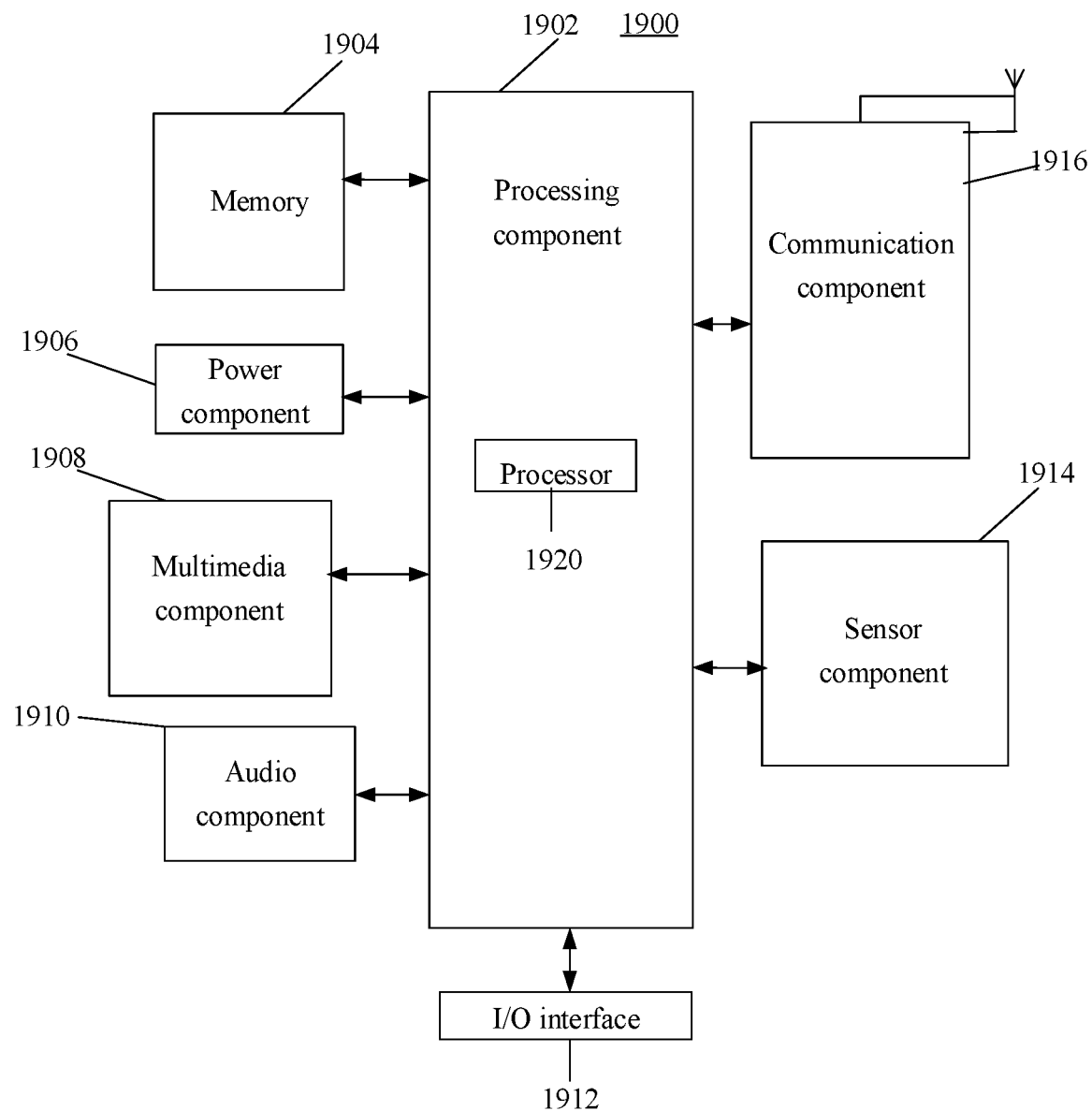
FIG. 19 is another structural diagram illustrating a signal transmission apparatus according to an example.

FIG. 19 is another structural diagram illustrating a signal transmission apparatus 1900 according to an example. For example, the apparatus 1900 may be a mobile phone, a computer, a digital broadcasting terminal, a message receiving and transmitting device, a game console, a tablet device, a medical device, a fitness device, a personal digital assistant, and so on.

Referring to FIG. 19, the apparatus 1900 may include one or more of the following components: a processing component 1902, a memory 1904, a power supply component 1906, a multimedia component 1908, an audio component 1910, an input/output (I/O) interface 1912, a sensor component 1914 and a communication component 1916.

The processing component 1902 generally controls overall operations of the apparatus 1900, such as operations associated with display, phone calls, data communications, camera operations, and recording operations. The processing component 1902 may include one or more processors 1920 to execute instructions to complete all or part of the steps of the above methods. In addition, the processing component 1902 may include one or more modules which facilitate the interaction between the processing component 1902 and other components. For example, the processing component 1902 may include a multimedia module to facilitate the interaction between the multimedia component 1908 and the processing component 1902.

The memory 1904 is to store various types of data to support the operation of the apparatus 1900. Examples of such data include instructions for any application or method operated on the apparatus 1900, contact data, phonebook data, messages, pictures, videos, and so on. The memory 1904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1906 provides power to different components of the apparatus 1900. The power supply component 1906 may include a power management system, one or more power supplies, and other components associated with generating, managing, and distributing power for the apparatus 1900.

The multimedia component 1908 includes a screen providing an output interface between the apparatus 1900 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1908 may include a front camera and/or a rear camera. The front camera and/or rear camera may receive external multimedia data when the apparatus 1900 is in an operating mode, such as a photographing mode or a video mode. Each of the front camera and the rear camera may be a fixed optical lens system or have focal length and optical zooming capability.

The audio component 1910 is to output and/or input an audio signal. For example, the audio component 1910 includes a microphone (MIC). When the apparatus 1900 is in an operating mode, such as a call mode, a recording mode, and a voice recognition mode, the MIC is to receive an external audio signal. The received audio signal may be further stored in the memory 1904 or sent via the communication component 1916. In some examples, the audio component 1910 further includes a speaker to output an audio signal.

The I/O interface 1912 may provide an interface between the processing component 1902 and peripheral interface modules. The above peripheral interface modules may include a keyboard, a click wheel, buttons and so on. These buttons may include, but are not limited to, a home button, a volume button, a starting button and a locking button.

The sensor component 1914 includes one or more sensors to provide status assessments of various aspects for the apparatus 1900. For example, the sensor component 1914 may detect the on/off status of the apparatus 1900, and relative positioning of component, for example, the component is a display and a keypad of the apparatus 1900. The sensor component 1914 may also detect a change in position of the apparatus 1900 or a component of the apparatus 1900, a presence or absence of the contact between a user and the apparatus 1900, an orientation or an acceleration/deceleration of the apparatus 1900, and a change in temperature of the apparatus 1900. The sensor component 1914 may include a proximity sensor to detect the presence of a nearby object without any physical contact. The sensor component 1914 may further include an optical sensor, such as a Complementary Metal-Oxide-Semiconductor (CMOS) or Charged Coupled Device (CCD) image sensor which is used in imaging applications. In some examples, the sensor component 1914 may further include an acceleration sensor, a gyroscope sensor, a magnetic sensor, a pressure sensor, or a temperature sensor.

The communication component 1916 is to facilitate wired or wireless communication between the apparatus 1900 and other devices. The apparatus 1900 may access a wireless network that is based on a communication standard, such as Wi-Fi, 2G or 3G, or a combination thereof. In an example, the communication component 1916 receives a broadcast signal or broadcast-associated information from an external broadcast management system via a broadcast channel. In an example, the communication component 1916 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 1900 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory computer-readable storage medium including instructions, such as a memory 1904 including instructions. The above instructions may be executed by the processor 1920 of the apparatus 1900 to complete the above method. For example, the non-transitory computer-readable storage medium may be a Read-Only Memory (ROM), a Random Access Memory (RAM), CD-ROM, a magnetic tape, a floppy disk, and an optical data storage device and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A signal transmission method, comprising:
   transmitting, by a base station, a synchronization signal block (SSB) to a user equipment (UE); wherein the SSB carries a physical broadcast channel (PBCH), a primary synchronization signal (PSS), a secondary synchronization signal (SSS), and a demodulation reference signal (DMRS),
   wherein the DMRS comprises a first frequency domain part and a second frequency domain part, the first frequency domain part and the SSS are frequency-division-multiplexed in one symbol, and the DMRS and the SSS are used as references for a demodulation result of the PBCH;
   wherein the SSB comprises a first time domain part and a second time domain part, the PSS is in the first time domain part and the SSS is in the second time domain part; and
   wherein the first time domain part is located at a head of the SSB.

2. The method of claim 1, wherein the second frequency domain part and the PSS are frequency-division-multiplexed in another symbol.

3. A signal receiving method, comprising:
   receiving, by a user equipment (UE), a synchronization signal block (SSB) from a base station; wherein the SSB carries a physical broadcast channel (PBCH), a primary synchronization signal (PSS), a secondary synchronization signal (SSS) and a demodulation reference signal (DMRS),
   wherein the DMRS comprises a first frequency domain part and a second frequency domain part, the first frequency domain part and the SSS are frequency-division-multiplexed in one symbol, and the DMRS and the SSS are used as references for a demodulation result of the PBCH;
   wherein the SSB comprises a first time domain part and a second time domain part, the PSS is in the first time domain part and the SSS is in the second time domain part; and
   wherein the first time domain part is located at a head of the SSB.

4. The method of claim 3, wherein the second frequency domain part and the PSS are frequency-division-multiplexed in another symbol.

5. User equipment (UE), comprising:
   at least one processor; and
   a non-transitory computer-readable storage medium coupled to the at least one processor and storing programming instructions for execution by the at least one processor, the programming instructions instruct the at least one processor to:
   receive a synchronization signal block (SSB) from a base station;
   wherein the SSB carries a physical broadcast channel (PBCH), a primary synchronization signal (PSS), a secondary synchronization signal (SSS) and a demodulation reference signal (DMRS);
   wherein the DMRS comprises a first frequency domain part and a second frequency domain part, the first frequency domain part and the SSS are frequency-division-multiplexed in one symbol, and the DMRS and the SSS are used as references for a demodulation result of the PBCH;
   wherein the SSB comprises a first time domain part and a second time domain part, the PSS is in the first time domain part and the SSS is in the second time domain part; and
   wherein the first time domain part is located at a head of the SSB.

6. The UE of claim 5, wherein the second frequency domain part and the PSS are frequency-division-multiplexed in another symbol.

7. A base station, comprising:
   at least one processor; and
   a non-transitory computer-readable storage medium coupled to the at least one processor and storing programming instructions for execution by the at least one processor, the programming instructions instruct the processor at least one to perform the method of claim 1.

8. The base station of claim 7, wherein the second frequency domain part and the PSS are frequency-division-multiplexed in another symbol.

9. A non-transitory computer-readable storage medium comprising instructions which, when executed by a computer, cause the computer to carry out the method of claim 1.

10. A non-transitory computer-readable storage medium comprising instructions which, when executed by a computer, cause the computer to carry out the method of claim 2.

11. A non-transitory computer-readable storage medium comprising instructions which, when executed by a computer, cause the computer to carry out the method of claim 3.

12. A non-transitory computer-readable storage medium comprising instructions which, when executed by a computer, cause the computer to carry out the method of claim 4.

* * * * *